US009094734B2

(12) United States Patent
Mathews et al.

(10) Patent No.: US 9,094,734 B2
(45) Date of Patent: Jul. 28, 2015

(54) ADVERTISEMENT MONITOR SYSTEM

(71) Applicant: Verizon Patent and Licensing Inc., Basking Ridge, NJ (US)

(72) Inventors: Robin Montague Mathews, Westford, MA (US); Michael Patrick Ruffini, Methuen, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/715,382

(22) Filed: Dec. 14, 2012

(65) Prior Publication Data

US 2014/0173651 A1    Jun. 19, 2014

(51) Int. Cl.
| H04N 7/10 | (2006.01) |
| H04N 7/025 | (2006.01) |
| H04N 21/81 | (2011.01) |
| H04N 21/436 | (2011.01) |
| H04N 21/438 | (2011.01) |
| H04N 21/6543 | (2011.01) |

(52) U.S. Cl.
CPC ......... *H04N 21/812* (2013.01); *H04N 21/4383* (2013.01); *H04N 21/43615* (2013.01); *H04N 21/6543* (2013.01)

(58) Field of Classification Search
None
See application file for complete search history.

(56) References Cited

U.S. PATENT DOCUMENTS

| 2003/0058707 A1* | 3/2003 | Dilger et al. ................. 365/200 |
| 2007/0022032 A1* | 1/2007 | Anderson et al. .............. 705/35 |
| 2008/0244667 A1* | 10/2008 | Osborne ......................... 725/94 |
| 2010/0250327 A1* | 9/2010 | Relyea et al. .................. 705/10 |
| 2011/0053623 A1* | 3/2011 | Rovira et al. ................ 455/507 |
| 2011/0145857 A1* | 6/2011 | Agarwal et al. ................ 725/32 |
| 2012/0011557 A1* | 1/2012 | Mathews et al. ............. 725/131 |

* cited by examiner

*Primary Examiner* — Nasser Goodarzi
*Assistant Examiner* — Adil Ocak

(57) ABSTRACT

A method includes identifying an advertisement break in a video program schedule. A target group of subscriber devices to receive advertisements at the advertisement break is also identified. The method includes assigning attributes associated with the target group of subscriber devices to each of a plurality of video client applications. Parameters are provided to a plurality of quadrature amplitude modulation (QAM) tuners based on each of the assigned plurality of video client applications. A video stream that includes an advertisement insertion event is received at the scheduled advertisement break from the plurality of QAM tuners. The advertisement insertion event includes an in-band signal that directs each of the assigned plurality of video client applications to tune to an advertisement feed associated with each of the at least one target group of subscriber devices for a duration of the advertisement break.

19 Claims, 8 Drawing Sheets

FIG. 6

| AD BREAK 602 | GROUP ID 604 | AD 606 | TIME 608 | ADVERTISER 610 |
|---|---|---|---|---|
| AD BREAK 1 | GROUP 604-a | AD 606-a | TIME 608-1 | ADVERTISER A |
| AD BREAK 1 | GROUP 604-b | AD 606-b | TIME 608-1 | ADVERTISER A |
| AD BREAK 1 | GROUP 604-c | AD 606-c | TIME 608-1 | ADVERTISER A |
| AD BREAK 2 | GROUP 604-a | AD 606-d | TIME 608-2 | ADVERTISER C |
| AD BREAK 2 | GROUP 604-b | AD 606-e | TIME 608-2 | ADVERTISER B |
| AD BREAK 2 | GROUP 604-c | AD 606-a | TIME 608-2 | ADVERTISER A |

ADVERTISEMENT MONITOR SYSTEM

BACKGROUND

Video service providers currently provide multiple services and programs, including cable television, network television, and video-on-demand, to their customers. In some instances, individual customers may receive combinations of these services from a single video service provider. Video service providers manage relationships with their customers using customer accounts that correspond to the multiple services.

BRIEF DESCRIPTION OF THE DRAWINGS

FIG. 6 is a table of scheduler advertisement insertion information;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may implement monitoring of targeted advertisements ("ads") inserted in video streams (i.e., advertisement insertion events). The systems and methods provide a flexible architectural implementation of an advertisement monitor system that combines a dynamic scheduler with the use of pseudo-client devices that emulate protocols (e.g., the client digital living network alliance (DLNA) protocol) associated with set top boxes for particular targeted customers. The dynamic scheduler provides instructions for the pseudo-clients to capture media based on predetermined schedules. The pseudo-clients may store advertisement insertion events locally and send any event information to a reporting module.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1:
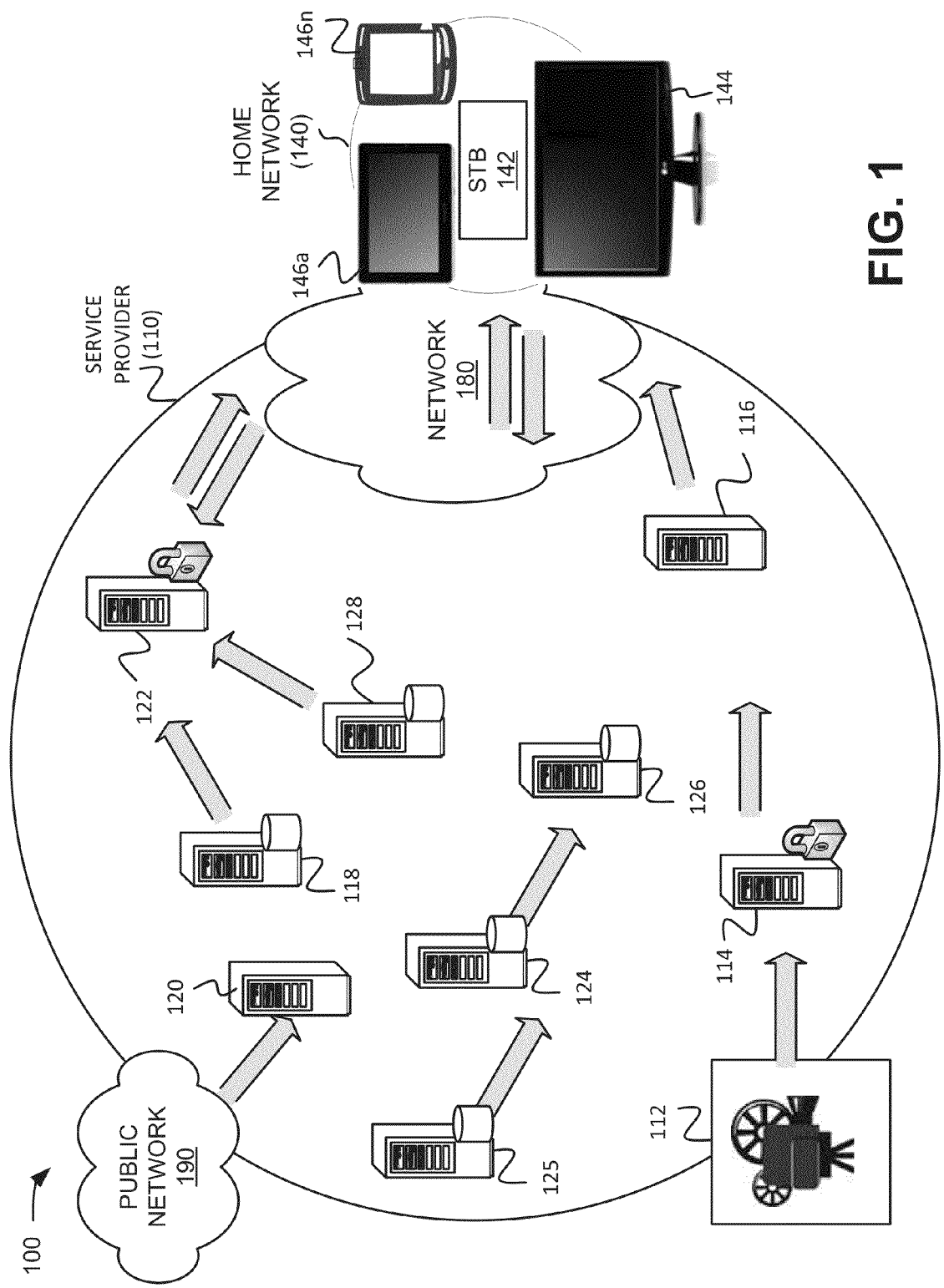
FIG. 1 illustrates an exemplary network in which systems and methods described herein may be implemented.

FIG. 1 illustrates an exemplary environment 100 in which systems and/or methods described herein may be implemented. As shown in FIG. 1, environment 100 may include a video service provider network 110, a home network 140, an access network 180, and a public network 190. Video service provider network 110 may include a content provider 112 (or alternatively, video service provider network 110 may receive video content from content provider 112), a content processing system 114, a content delivery system 116, a search server 118, a guide server 120, an application server 122, a profile server 124, an advertisement (ad) insertion server 125, an advertisement monitor system 126, and a license server 128. Home network 140 may include one or more STBs 142, televisions 144, one or more user devices 146a through 146n, and/or personal computers (not shown). Devices and/or networks of FIG. 1 may be connected via wired and/or wireless connections.

Video service provider network 110 may collect, generate, and provide video content to subscribers of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Video service provider network 110 may also provide support services for the video service, including advertisement monitoring, as described with respect to FIGS. 2 to 8 hereinbelow, authentication, authorization, and billing of subscribers for particular video services.

Content provider 112 may include one or more providers of video content. For example, content provider 112 may include a television network, a cable television station, a film distributor, etc. Content provider 112 may provide video content to content processing system 114 in a variety of signals and formats, such as a baseband video signal, MPEG video, etc.

Content processing system 114 may store and process video content. Content processing system 114 may encode video content using, for example, public/private keys. Content processing system 114 may also transcode the video content. Content processing system 114 may store video content in an encrypted and/or encoded form.

Content delivery system 116 may provide video content, instructions, and/or other information to home network 140 and associated devices, such as set-top-box (STB) 142 and user devices 146a-146n (collectively referred to as user devices 146 and individually as user device 146). In one implementation, content delivery system 116 may provide broadcast video content via a quadrature amplitude modulation (QAM) based system that may be limited in bandwidth capacity (i.e., a number and/or quality of channels may be limited based on the capacity of video service provider network 110). In other implementations, content delivery system 116 may provide video content via adaptive coding modulation (ACM) or via Internet protocol (IP), etc.

Content delivery system 116 may temporarily store and provide content requested by user device 146 and/or STB 142. In one implementation, access to content delivery system 116 (e.g., by STB 142 and/or user device 146) may be restricted by a service provider that operates content delivery system 116. For example, access to content delivery system 116 may be restricted to particular users with particular subscription packages and enforced by, for example, password protection, device identifiers (for user devices 146a-146n, STB 142 and/or home network 140), and/or application identifiers (e.g., residing on user devices 146a-146n, STB 142 and/or portable media). Content delivery system 116 may include other devices (not shown), such as a content server, a policy management server, a streaming device, a router, a content cache, etc.

Search server 118 may provide support for an integrated video search function (executed by STBs 142, televisions 144, one or more user devices 146, and/or personal computers at home network 140), for searching among video content that may be provided to subscribers by a content delivery system 116, and video content that may be provided by an associated external network, such as the Internet. The video content may be provided at particular subscribed channels (i.e., an ongoing live broadcast that is part of the subscriber's package), on a pay-per-view basis, or "on demand" (i.e., particular content may be provided upon user request).

Guide server 120 may provide an integrated video guide to subscribers. The integrated video guide may include integrated video content from a video service provider network 110, such as a QAM based system, and from an additional network, such as the Internet. The integrated video guide may provide listings of channels, viewing times, descriptions of video content, access restrictions, payment requirements, etc.

Application server 122 may provide one or more applications that may allow subscribers to browse, purchase, rent, subscribe, and/or view video content. Application server 122 may authenticate a user who desires to purchase, rent, or subscribe to video content. In one implementation, application server 122 may interact with STB 142 or user device 146 using the hypertext transfer protocol (HTTP) or the secure HTTP (HTTPS). In another implementation, application server 122, STB 142 and user device 146 may interact with one another using another type of protocol.

Profile server 124 may store user profile information for users (e.g., users of user devices 146). The user profile information may include, got example, login information (e.g., a user identifier and a password), targetable information associated with the user (e.g., types of products purchased by the user, income of the user, household characteristics, whether the user is a pet owner, etc.), demographic information, billing information, address information (including zip codes), types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc. Application server 122 may use the user profile information from profile server 124 to authenticate a user (or associated users) and may update the user profile information based on the user's activity (e.g., with the user's express permission).

Advertisement insertion server 125 may use radio frequency (RF)/QAM channels to distribute advertisements to STBs 142 via "hidden" (from the point of view of the customer) QAM channels provided in addition to video streams directly associated with particular channels or programs. An advertisement insertion event occurs when advertisement insertion server 125 instructs STBs 142 to tune to these hidden channels at scheduled advertisement breaks to view/display addressable or zoned advertisements specific to their target group (these instructions may be sent to the STB 142 via an in-band signal in a video (e.g., broadcast) stream provided by content delivery system 116). Advertisement insertion server 125 may use the user profile information from profile server 124 to provide targeted advertisements to STBs 142 associated with particular groups of subscribers. The STBs 142 may tune back to RF/QAM channels of the video stream at the completion of the advertisement break (or alternately, to another targeted ad).

Advertisement monitor system 126 may implement monitoring of targeted advertisements inserted in video streams. Advertisement monitor system 126 may provide a flexible architecture that combines a scheduling module (or device) with the use of pseudo-client devices that emulate protocols associated with STBs 142, such as the client digital living network alliance (DLNA) protocol, for particular targeted customers. Advertisement monitor system 126 is described in greater detail below with reference to FIG. 2.

License server 128 may provide key and license management. License server 128 may communicate with user devices 146 and/or STB 142 directly or via application server 122. For example, license server 128 may receive a request from STB 142 for a license relating to video content that STB 142 has downloaded. The license may include information regarding the type of use permitted by user device 146 or STB 142 (e.g., a purchase, a rental, limited shared usage, or a subscription) and a decryption key that permits STB 142 to decrypt the video content or application. In one implementation, the communications between license server 128 and STB 142 may be conducted over a secure channel, may include the use of public and private keys, or may include other forms of secure communication.

Home network 140 may include one or more devices that transmit requests to content delivery system 116, search server 118, guide server 120, application server 122, profile server 124, and/or license server 128, and receive information from content delivery system 116, search server 118, guide server 120, application server 122, profile server 124, advertisement monitor system 126, and/or license server 128. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

STB 142 may receive content from content delivery system 116, and/or an external network, such as the Internet, and output the content to TV 144 and/or user devices 146*a*-146*n*. For example, STB 142 may receive a range of channels from content delivery system 116 via QAM. STB 142 may also receive hidden QAM channels, for example, from content delivery system 116. STB 142 may output the content as on-demand content and/or live TV content (i.e., ongoing content that may not be available on an on-demand basis). STB 142 may include a component (e.g., a cable card or a software application) that plugs into a host device (e.g., TVs 144, and/or other devices, such as personal computers, mobile telephones, etc.) that allows the host device to play content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to play content, other embodiments may use any device (e.g., a computer or a mobile phone) to play/provide content.

User device 146 may include any device capable of communicating via a network, such as home network 140 and/or access network 180. User device 146 may include an interactive client interface, such as a graphic user interface (GUI. User device 146 may include digital rights management (DRM) functionality to retrieve security information (e.g., decryption keys) and decrypt protected content received from content delivery system 116. Examples of user device 146 may include a mobile phone, a tablet, a personal computer, or another device that may receive video program related items, such as video program related applications and video program related content, and provide the video program related items at user device 146.

Access network 180 may provide customers with multimedia content from (e.g., from content delivery system 116). Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of networks that provide services to home network 140. In one implementation, access network 180 may be connected to home network 140 via an optical communication link, such as an optical fiber provided to home network 140. In another implementation, access network 180 may be connected to home network 140 via a coaxial cable. In still another implementation, access network 180 may be connected to home network 140 via a wireless (e.g., satellite) connection.

Public network 190 may include a WAN, an intranet, the Internet, a telephone network (e.g., the Public Switched Telephone Network), or a combination of networks. Public network 190 may include, for example, an untrusted network, such as the Internet. Public network 190 may further include network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 116 may be implemented as multiple devices.

In implementations described herein, a system and method for inserting targeted advertisements into video streams and monitoring the targeted advertisements is disclosed. The system and method may be implemented in conjunction with advertisement monitor system 126, which combines an advertisement server device, a dynamic scheduler and pseudo-client devices that emulate protocols associated with STBs 142 as described with respect to FIG. 2.

Figure 2:
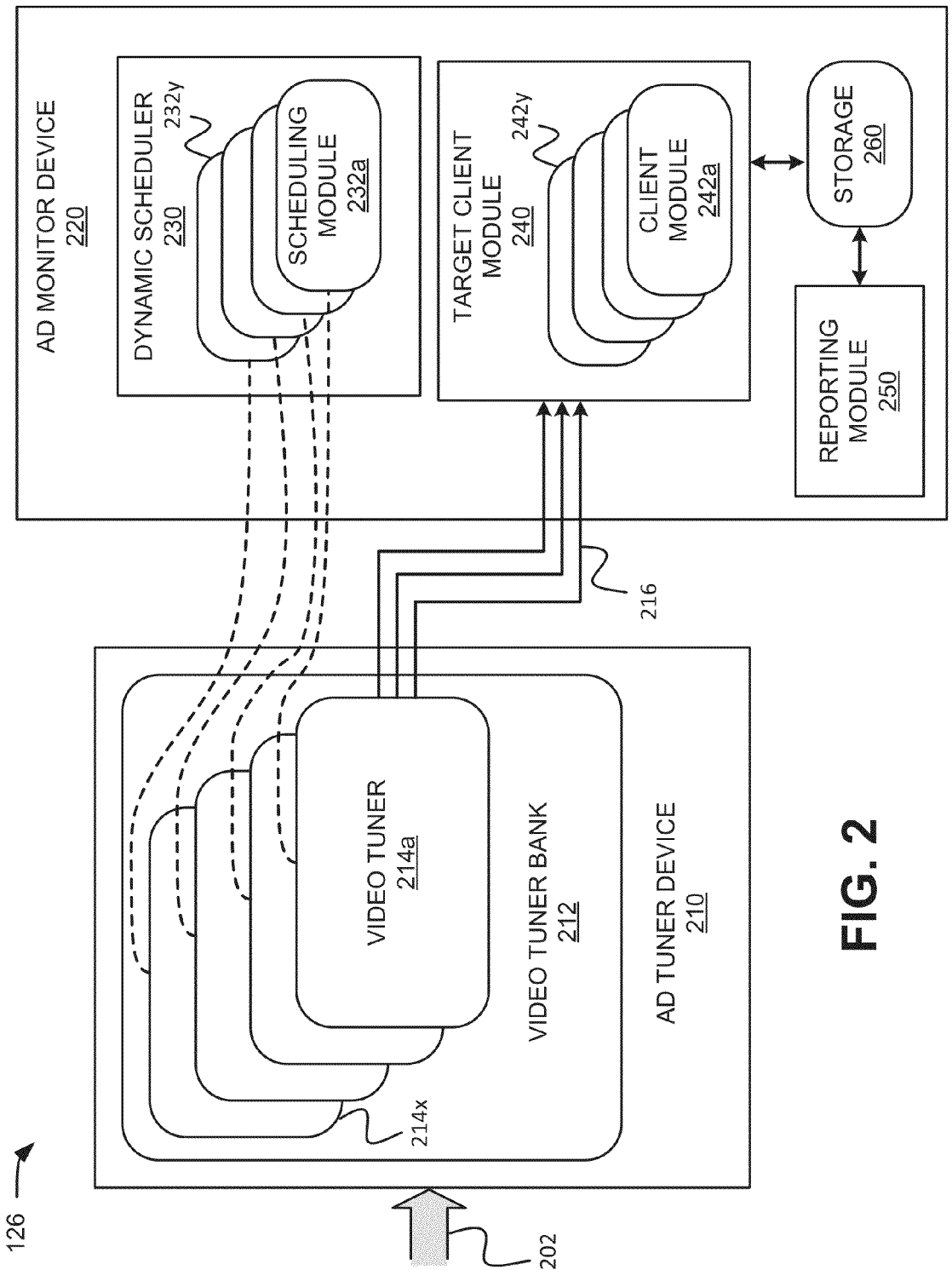
FIG. 2 illustrates an exemplary advertisement monitor system in which systems and methods described herein may be implemented.

FIG. 2 illustrates a functional block diagram of advertisement monitor system 126 in which systems and/or methods described herein may be implemented. Advertisement monitor system 126 may monitor the targeted advertisements that are inserted into video streams associated with particular customers to ensure that the targeted advertisements are delivered without any video, audio or timing issues. As shown in FIG. 2, advertisement monitor system 126 may include an advertisement tuner device 210, and an advertisement monitor device 220.

Advertisement tuner device 210 may receive a video band 202 and tune to particular video streams 216 associated with target customers. Advertisement tuner device 210 may include a video tuner bank 212 that may tune to different video streams based on input received from (components of) advertisement monitor device 220, particularly dynamic scheduler 230. Advertisement tuner device 210 may tune to particular video streams 216 that may be scheduled to display advertisements. The video streams 216 may include in-band signaling targeted to particular STBs 142 associated with particular users. The advertisements may be scheduled to be displayed at advertisement breaks in programs received by the STBs 142. In one implementation, advertisement tuner device 210 may be implemented using a QAM bank that includes multiple QAM tuners, such as described with respect to advertisement tuner device 400 and FIG. 4 below.

Advertisement monitor device 220 may select and monitor video streams 216 associated with target groups (of subscriber devices, i.e., STBs 142). Advertisement monitor device 220 may include a dynamic scheduler 230, a target client module 240, a reporting module 250, and a storage module 260. Advertisement monitor device 220 may allow an operator of network 100 to monitor (e.g., visually, based on metadata, etc.) whether a video stream corresponding to STBs 142 associated with targeted customers has tuned to a correct advertisement stream and determine whether the advertisement has been correctly displayed.

Dynamic scheduler 230 may schedule video streams that correspond to different target groups. Target client module 240 may emulate protocols associated with STBs 142 of target customers. Target client module 240 may be implemented based on different protocols for set top boxes. In one implementation, advertisement monitor device 220 may be implemented using DLNA client modules, such as described below with respect to advertisement monitor device 500 and FIG. 5.

Dynamic Scheduler 230 may be implemented in conjunction with advertisement tuner device 210 using a client/server topology in which pseudo-client applications associated with target groups of subscriber devices (e.g., DLNA client modules 512a-512y described with respect to FIG. 5 below) communicate with advertisement tuner device 210. Storage module 260 may store advertisement insertion events including a time and recorded video of the advertisement insertion event. Reporting module 250 may provide data regarding the advertisement insertion event, such as targeted customer groups, associated advertisers, issues with the advertisement insertion, etc.

Advertisement monitor system 126 may be implemented with a design that incorporates pluggable protocol modules which are extensible to multiple other protocols. The targeted advertisements may be provided in association with particular targeted customers (or customer STBs 142). Advertisement monitor system 126 may be located in a video hub facility, such as service provider network 110 within network 100, and may be used by operators to monitor dynamic advertisement insertion in video streams 216.

Figure 3:
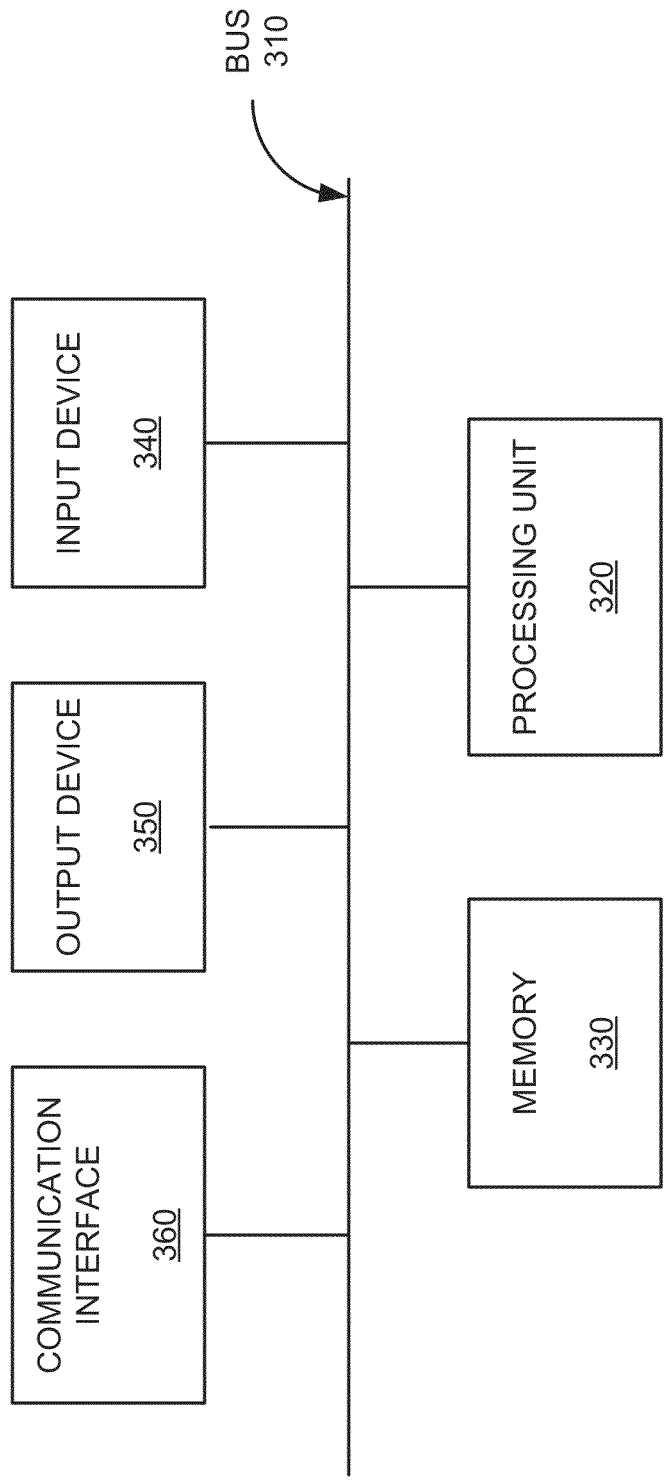
FIG. 3 illustrates an exemplary configuration of one or more of the components of FIGS. 1 and 2.

FIG. 3 is a diagram of example components of a device 300. Each of content provider 112, content processing system 114, content delivery system 116, search server 118, guide server 120, application server 122, profile server 124, license deserver 128, and/or devices in home network 140, such as STB 142, user devices 146a-146n, may include one or more devices 200. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of environment 100.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
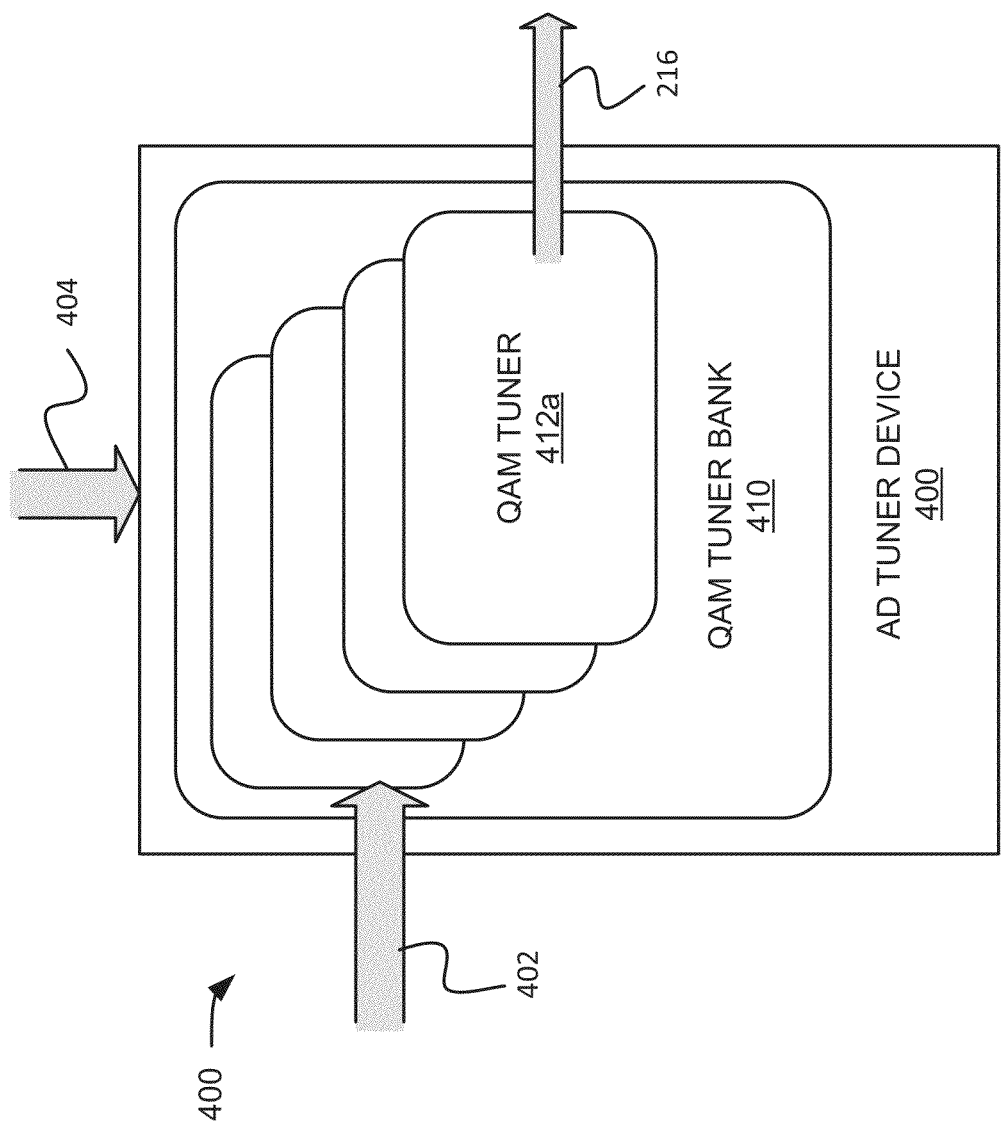
FIG. 4 is a diagram of exemplary functional components of the advertisement tuner device of FIG. 2.

FIG. 4 is a diagram of exemplary functional components of an advertisement tuner device 400. In one implementation, the functions described in connection with FIG. 4 may be performed by one or more components of device 300 (FIG. 3). As shown in FIG. 4, advertisement tuner device 400 may include a QAM tuner bank 410. Advertisement tuner device 400 may be a QAM-based implementation of advertisement tuner device 210, described with respect to FIG. 2 above. Although advertisement tuner device 400 is described with respect to QAM, in other implementations advertisement tuner devices 400/210 may use different video modulation schemes, such as ACM.

QAM tuner bank 410 may include multiple QAM tuners 412 (shown as QAM tuners 412a-412x in FIG. 4). QAM tuner bank 410 may receive QAM input 402 (e.g., from content delivery system 116). Advertisement tuner device 400 may receive tuning input 404, e.g., from advertisement monitor device 220, tuning video streams 216 from each QAM tuner 412 to a particular channel. QAM tuner bank 410 may receive tuning information, for example, from advertisement monitor device 220 (in particular dynamic scheduler 230, described with respect to FIG. 2 above) preceding a scheduled advertisement break. QAM tuner bank 410 may tune to video streams 216 that include channels and send the video streams 216 (that include signaling) to target client module 240 that simulate STBs 142 associated with devices for particular customers, such as smart TVs and other appliances within a particular home network 140 using particular client-server protocols.

The video streams 216 may include in-band RF signaling and streams for hidden QAM channels provided by advertisers that may be targeted to owners of particular STBs 142. The video streams 126 may include advertisements based on targetable information, address information, etc., provided by profile server 124. Each video stream may correspond to a target group and client module (e.g., DLNA client modules 512 as described below with respect to FIG. 5).

Figure 5:
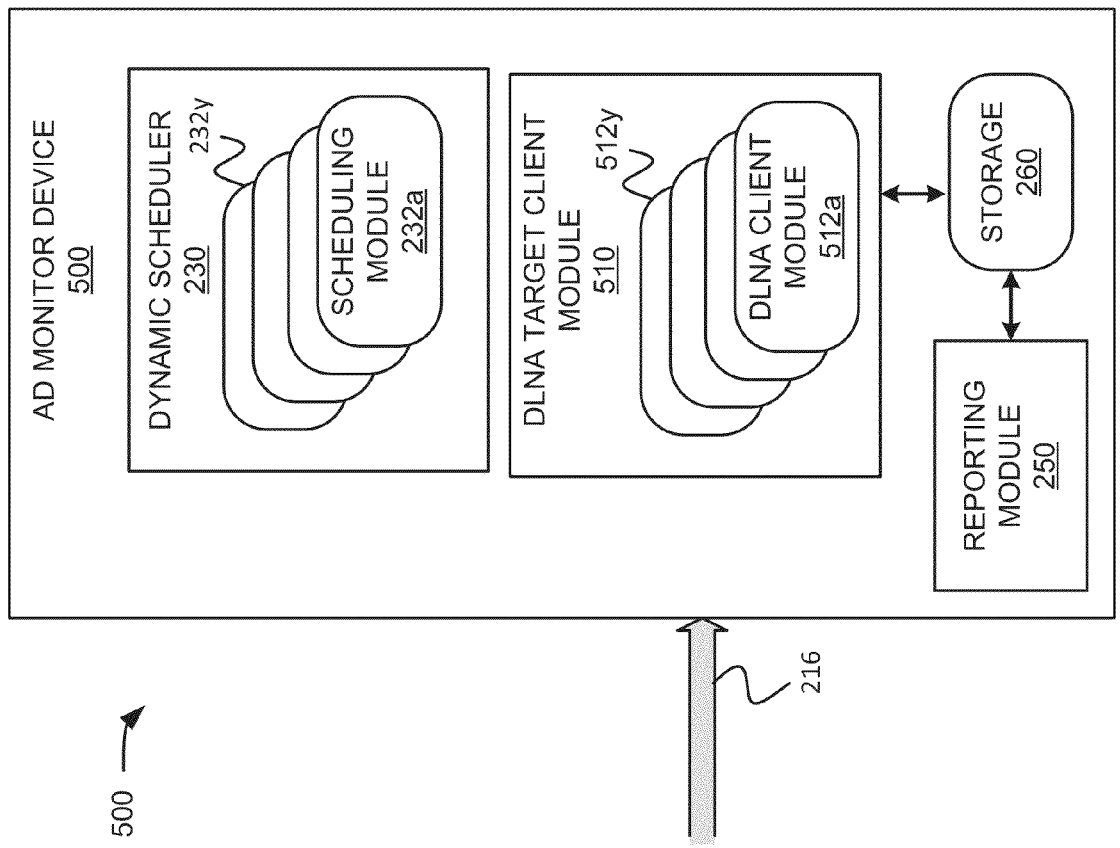
FIG. 5 is a diagram of exemplary functional components of the advertisement monitor device of FIG. 2.

FIG. 5 is a diagram of exemplary functional components of advertisement monitor device 500. In one implementation, the functions described in connection with FIG. 5 may be performed by one or more components of device 300 (FIG. 3). As shown in FIG. 5, advertisement monitor device 500 may include a dynamic scheduler 230, a DLNA target client module 510, a storage module 260, and a reporting module 250. Advertisement monitor device 500 may be a DLNA protocol-based implementation of advertisement monitor device 220, described with respect to FIG. 2 above. Advertisement monitor device 500 is described with respect to advertisement tuner device 400.

Advertisement monitor device 500 may assign resources for video tuning (e.g., QAM tuning based on one or multiple advertisement tuning devices 400 as described with respect to FIG. 4 above) based on different target groups and direct the generated video stream 216 to a monitoring tap (i.e., DLNA target client module 510) that places the output in storage (i.e., storage module 260) for subsequent reporting and review purposes (e.g., via reporting module 250). Advertisement monitor system 126 may provide a system that is scalable as a number of zones or target group's increases. For example, additional advertisement tuning devices 400 may be connected to advertisement monitoring device 500.

Dynamic scheduler 230 may include DLNA scheduling modules 232 (shown as scheduling modules 232a to 232-y) that may correspond to different target groups (of subscriber devices, i.e., STBs 142). Dynamic scheduler 230 may identify pre-scheduled events (e.g., upcoming advertisement breaks) on particular channels. For example, dynamic scheduler 230 may receive a video program (broadcast) schedule that includes scheduled time slots for advertisement breaks. Dynamic scheduler 230 may schedule parameter changes to QAM resources (i.e., QAM tuners 412, FIG. 4) on advertisement tuner device 400 based on the upcoming advertisement breaks. Dynamic scheduler 230 may control multiple video streams 216 (e.g., via QAM tuner bank 410) and assign variable parameters to each video stream 216 based on attributes of a target group of STBs 142 (such as a zone id that identifies different geographical zones in which STBs 142 may be located) at different instances of time. Each QAM tuner 412 may be tuned independent of other QAM tuners 412. For example, in an instance in which subscribers are grouped into five zones based on zip code in a given video hub office, advertisement monitor system 126 may monitor advertisements for each zip code to enable the zoned groups to be switched to a different advertisement stream during an advertisement insertion break.

Dynamic scheduler 230 may provide instructions for DLNA target client module 510 to process and capture media based on predetermined schedules. Dynamic scheduler 230 may determine that pre-scheduled events have occurred (e.g., a program starts or an upcoming advertisement indicator is detected in a video stream) and subsequently initiate advertisement tuner device 400 to provide video streams 216 based on particular DLNA client modules 512 (i.e., a pseudo-client associated with DLNA target client module 510) to receive the media (e.g., video stream 216) and perform client protocol interactions. Each DLNA client module 512 may be assigned attributes of a target group of subscribers or subscriber STBs 142.

DLNA target client module 510 may receive and record video stream 216 for multiple targeting characteristics (i.e., each of DLNA client modules 512a-512y may capture subscriber observable video for a different targeting characteristic at a particular instance). For example, a DLNA client module 512 may be associated with a particular zip code for a particular advertisement break. DLNA target client module 510 may store advertisement insertion events locally at storage module 260 and pass any event information to reporting module 250. DLNA target client module 510 may process and reformat the media generated from advertisement tuner device 400 and store, process and forward the media for further processing to other devices in network 100. For example, DLNA target client module 510 may include metadata indicating a target group associated with the processed video.

According to an example, dynamic scheduler 230 may identify a scheduled advertisement break on a network channel at 2:10 PM. Dynamic scheduler 230 may instruct all of the QAM tuners 412 on advertisement tuner device 400 to tune to that particular network channel. Client modules 512a-512y may be able to set specific attributes on advertisement tuner device 400, indicating that each client module 512 belongs to a specific targeting group. For example, each client module 512 may be associated with a different zip-code, or other targeting characteristic of a group of subscribers, such as particular demographics, etc. When QAM tuners 412 receive the in-band signaling to tune to a specific QAM channel for advertisement insertion, each QAM tuner 412 will tune to a different channel based on the zip-code, other targeting characteristics, etc., associated with each client module 512. In some instances, multiple (or additional) advertisement tuner devices 400 may be implemented using a same interface on dynamic scheduler 230 to increase a number of target characteristics that may be monitored.

FIG. 6 illustrates an exemplary advertisement monitor table 600. As shown in FIG. 6, advertisement monitor table 600 may include multiple records corresponding to different advertisements (e.g., a unique record is shown in each row of FIG. 6) for each advertisement break 602. The record may include a particular advertisement break 602, a group ID 604, an advertisement 606, a time 608, and an advertiser 610. The particular arrangement and types of information in advertisement monitor table 600 and illustrated in FIG. 6 is included for simplicity.

Advertisement monitor table 600 includes information that dynamic scheduler 230 may access when determining targeting characteristics of DLNA client modules 512a-512y. Information from advertisement monitor table 600 may also be used by reporting module 250 in determining whether any errors occurred in advertisement insertion events. Errors may occur where the wrong advertisement is inserted, or when the advertisement is inserted at a wrong time (e.g., too early), etc. A separate record may be maintained for each combination of an advertisement break 602 and a (target) group ID 604.

Advertisement break 602 indicates a particular advertisement break on a program received in video stream 216. For example, advertisement break 1 may represent a thirty second time slot after a first segment of a cooking program. Advertisement break 2 may represent a thirty second time slot after a second segment on a news program. Group ID 604 indicates a particular target group for targeted advertisements included in the video stream 216. For example, group ID 604-a to group ID 604-c may each represent a particular zip code associated with target groups of subscriber devices (STBs 142).

Advertisement 606 indicates a particular advertisement that is scheduled to be shown. For example, advertisement 606-a may represent a commercial for kitchen utensils, advertisement 606-b may represent a travel commercial and advertisement 606-c may represent a dog food commercial, etc. Time 608 is a time at which the advertisement break occurs and advertiser 610 is an advertiser associated with a particular advertisement 606. Note that different advertisers 610 may provide advertisements 606 during a same program or advertisement break. In these instances, advertisement monitor system 126 may monitor advertisements 606 that are micro-targeted to different segments of viewership based on different targeting characteristics. For example, network personnel may visually consult advertisement monitor table 600 to identify instances in which advertisements for a particular advertiser or provided to a particular target group of STBs 142 are shown.

Figure 7:
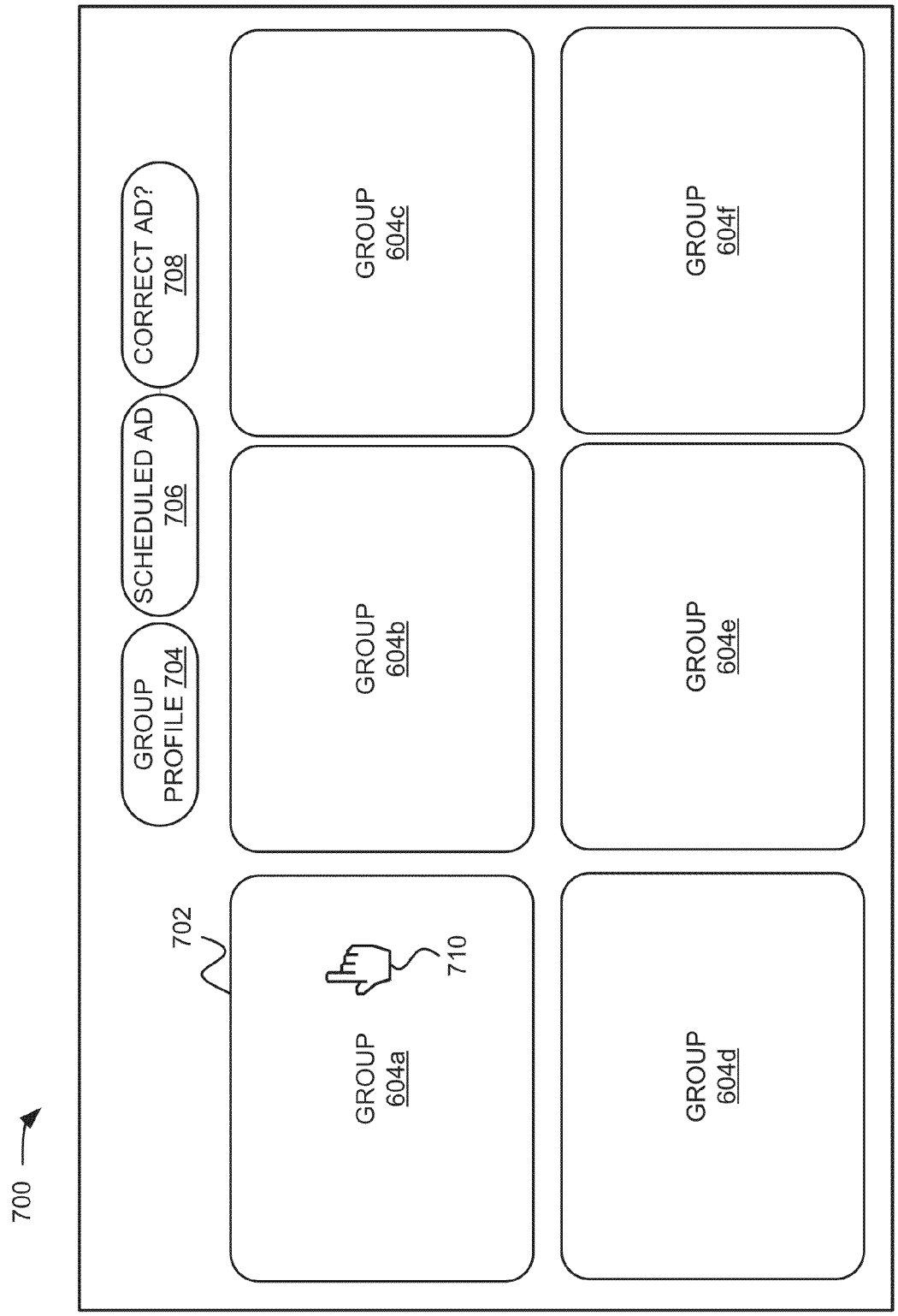
FIG. 7 is a diagram of an exemplary multi-group advertisement monitor display.

FIG. 7 is a diagram of an exemplary advertisement monitor interface 700. As shown in FIG. 7, advertisement monitor interface 700 may include a screen segment 702 associated with different group IDs 604. Advertisement monitor interface 700 may also include a group profile indicator 704, a scheduled advertisement indicator 706, a correct advertisement indicator 708, and a selection input 710.

Advertisement monitor interface 700 may display multiple "real time" video streams 216 of advertisement insertion events for each target group on appropriately enabled and authorized devices (e.g., for group IDs 604a to 604f). For example, if there are six target groups, advertisement monitor device 220 (shown in FIG. 2) may output a monitoring video stream that includes an advertisement feed associated with each of the target groups. Advertisement monitor interface 700 may be used to concurrently display six screen segments that carry advertisement insertion events based on each of the target groups during advertisement breaks. The program may switch back to single screen segment showing the video program in which the targeted advertisements are scheduled after the advertisement break. Selection input 710 may allow an end user to select one of the video streams 216 to receive additional information (e.g., group profile indicator 704, scheduled advertisement indicator 706, and correct advertisement indicator 708 associated with that particular video stream 216). Advertisement monitor interface 700 may be output to network personnel for trouble-shooting and monitoring purposes. Alternatively, advertisements associated with a particular advertiser (e.g., based on listed advertiser 708) may be output to that advertiser using advertisement monitor interface 700. In this instance, advertisement feeds that are not associated with the particular advertiser may not be shown.

Group profile indicator 704 may include information regarding targeting characteristics of the group (e.g., based on group ID 604). For example, group profile indicator 704 may indicate demographics of a particular group, a number of households in a group, a per capita income of a group or neighborhood, a consumer profile of a group, etc. The group profile indicator 704 may include zip code information and other identifying information for a target group.

Scheduled advertisement indicator 706 may indicate an advertisement that is scheduled to be displayed in association with a particular video stream 216. For example, advertisement monitor device 220 may output a video stream including metadata that indicates a target group for each ad, a scheduled ad, etc. The correct advertisement indicator 708 may allow the end user to indicate instances in which the displayed advertisement does not match the scheduled ad. This information may be stored for analysis at reporting module 250 or other parts of network 100.

Figure 8:
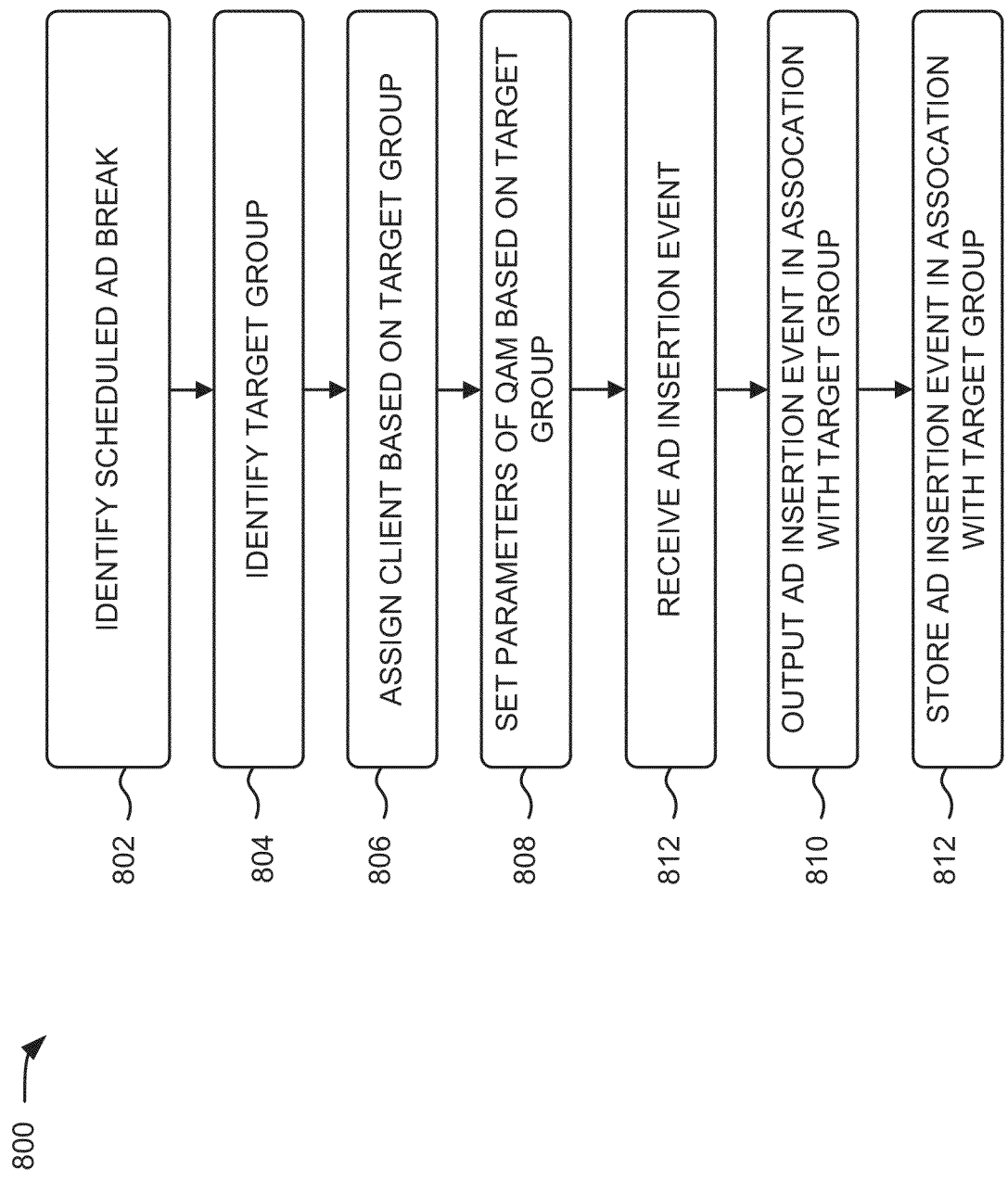
FIG. 8 is a flowchart of an exemplary process for monitoring advertisements inserted in a video stream.

FIG. 8 is a flowchart of an exemplary process 800 for monitoring targeted advertisements inserted into a video stream. Process 800 may execute in advertisement monitor device 500. In another implementation, some or all of process 800 may be performed by another device or group of devices, including or excluding advertisement monitor device 500. It should be apparent that the process discussed below with respect to FIG. 8 represents a generalized illustration and that blocks/steps may be added or existing blocks/steps may be removed, modified or rearranged without departing from the scope of process 800.

At block 802, advertisement monitor device 500 may identify a scheduled advertisement break. For example, advertisement monitor device 500 may receive a schedule that includes programs and advertisement break slots after different segments of the programs from guide server 120. The schedule may include program information and time indicators for advertisement breaks.

At block 804, advertisement monitor device 500 may identify target groups of subscribers for the identified advertisement break. For example, advertisement monitor device 500 may determine that a particular group of customers have been targeted based on information received from profile server 124.

Advertisement monitor device 500 may assign attributes of the target groups to each of the client modules 512a-512y (block 806). For example, advertisement monitor device 500 may implement the DLNA client modules 512a-512y as pseudo-client applications similar to STBs 142 provided to the subscribers that receive media and perform client protocol interactions.

Advertisement monitor device 500 may set (appropriate) parameters on the QAM tuners 412 based on the target groups (block 808). For example, advertisement monitor device 500 may provide a signal to advertisement tuner device 210 (shown in FIG. 2) indicating that the advertisement monitor device 500 has client applications (i.e., DLNA client modules 512 corresponding to target STBs 142) to receive the media (video stream 216) and perform client protocol interactions.

Advertisement monitor device 500 may receive video stream 216 (block 810). For example, advertisement tuner device 210 may output video streams 216 corresponding to each target group. DLNA client modules 512a-512y may receive the video streams 216 at the scheduled advertisement break. The advertisements received at the advertisement breaks may be identified as an advertisement insertion event.

At block 812, advertisement monitor device 500 may output the advertisement insertion event in association with the target group. For example, advertisement monitor device 500 may output the video stream 216 with associated metadata that indicates an advertiser and/or a target group to authorized devices associated with advertisers or network personnel (e.g., at an interface such as advertisement monitor interface 700).

Advertisement monitor device 500 may store advertisement insertion events in association with information identifying a target group of subscribers or subscriber devices (STBs 142) (block 814). For example, advertisement monitor device 500 may store advertisement insertion event and associated metadata to enable network personnel to perform diagnostic procedures at a later time.

Systems and/or methods described herein may implement monitoring of targeted advertisements inserted in video streams. The systems and methods combine a dynamic scheduler with the use of pseudo-client devices that emulate protocols associated with set top boxes for particular targeted customers.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   identifying, by a dynamic scheduling device of a service provider network, an advertisement break in a video program schedule, wherein the advertisement break comprises a time slot in a video content carried via a first quadrature amplitude modulation (QAM) channel;
   identifying, by the dynamic scheduling device, multiple target groups of subscriber devices, associated with a plurality of customer premises networks, to receive targeted advertisements at the advertisement break based on attributes shared by customers within each of the target groups;
   assigning, by the dynamic scheduling device, the attributes to each of a plurality of video client applications implemented in a plurality of pseudo-clients that simulate subscriber devices in the multiple target groups;
   instructing a plurality of QAM tuners to tune from the first QAM channel to a plurality of hidden QAM channels to generate and output a customer-observable video stream to each of the pseudo clients, based on emulation of a protocol associated with each of the target groups of subscriber devices; and
   instructing, by the dynamic scheduling device via in-band signaling, each of the pseudo clients to tune a different one of the hidden QAM channels to capture the customer-observable video stream output from the plurality of QAM tuners, to identify an error occurring with respect to an advertisement insertion event scheduled for one or more of the target groups of subscriber devices.

2. The computer-implemented method of claim 1, wherein the target groups are identified based on one or more of a zip code, a demographic characteristic or a zone identifier (ID) corresponding to each target group of subscriber devices or the plurality of customer premises networks.

3. The computer-implemented method of claim 1, wherein the pseudo-clients com rise digital living network alliance (DLNA) modules, and communicate with the plurality of QAM tuners using a DLNA protocol.

4. The computer-implemented method of claim 1, further comprising:
storing, by the plurality of video client applications, recorded video of the advertisement insertion event in association with metadata identifying the assigned attributes of the target groups of subscriber devices.

5. The computer-implemented method of claim 1, further comprising:
outputting, by the plurality of QAM tuners, the customer-observable video stream with metadata that identifies the advertisement feeds associated with each of the target groups of subscriber devices.

6. The computer-implemented method of claim 5, wherein the metadata includes an identifier of a scheduled ad.

7. The computer-implemented method of claim 1, further comprising:
outputting the customer-observable video stream to concurrently display screen segments, to service provider network personnel, via a monitor interface.

8. The computer-implemented method of claim 1, wherein identifying the advertisement break further comprises:
receiving the video program schedule; and
identifying the advertisement break in association with the target groups.

9. The computer-implemented method of claim 1, wherein instructing the plurality of QAM tuners comprises providing the parameters to a single device within the dynamic scheduling device.

10. A device implemented in a service provider network, comprising:
a memory to store a plurality of instructions; and
a processor configured to execute the instructions in the memory to:
identify an advertisement break in a video program schedule, wherein the advertisement break comprises a scheduled time slot in a video content carried via a first quadrature amplitude modulation (QAM) channel;
identify multiple target groups of subscriber devices, associated with a plurality of customer premises networks, to receive targeted advertisements at the advertisement break based on attributes shared by customers within each of the target groups;
assign the attributes associated to each of a plurality of video client applications implemented in a plurality of pseudo-clients that simulate subscriber devices in the multiple target groups;
instruct a plurality of QAM tuners to tune from the first QAM channel to a plurality of hidden QAM channels to generate and output a customer-observable video stream to each of the pseudo clients based on emulation of a protocol associated with each of the target groups of subscriber devices; and
instruct, via in-band signaling, each of the pseudo clients to tune a different one of the hidden QAM channels to capture the customer-observable video stream output from the plurality of QAM tuners, to identify an error occurring with respect to an advertisement insertion event scheduled for one or more of the target groups of subscriber devices.

11. The device of claim 10, wherein the processor is further configured to:
provide parameters to one or more of the QAM tuners.

12. The device of claim 10, wherein the processor is further configured to:
identify the target groups based on one or more of a zip code, a demographic characteristic or a zone identifier (ID) corresponding to each target group of subscriber devices or the plurality of customer premises networks.

13. The device of claim 10, wherein the pseudo-clients comprise digital living network alliance (DLNA) modules that communicate with the plurality of QAM tuners using a digital living network alliance (DLNA) protocol.

14. The device of claim 10, wherein the processor is further to:
store, by the plurality of video client applications, recorded video of the advertisement insertion event in association with metadata identifying the assigned attributes of the target groups of subscriber devices.

15. The device of claim 10, wherein the processor is further to:
output, via the plurality of QAM tuners, the customer-observable video stream with metadata that identifies the advertisement feeds associated with each of the target groups of subscriber devices.

16. The device of claim 10, wherein the assigned plurality of video client applications is scalable to receive video streams from additional video tuners.

17. A non-transitory computer-readable medium including instructions to be executed by a processor, the instructions including one or more instructions, when executed by the processor, for causing the processor to:
identify, by a dynamic scheduling device of a service provider network, an advertisement break in a video program schedule, wherein the advertisement break comprises a scheduled time slot in a video content carried via a first quadrature amplitude modulation (QAM) channel;
identify, by the dynamic scheduling device, multiple target groups of subscriber devices, associated with a plurality of customer premises networks, to receive targeted advertisements at the advertisement break;
assign, by the dynamic scheduling device, attributes to each of a plurality of video client applications implemented in a plurality of pseudo-clients that simulate subscriber devices in the multiple target groups;
instruct, by the scheduling device, a plurality of QAM tuners to tune from the first QAM channel to a plurality of hidden QAM channels to generate and output a customer-observable video stream to each of the pseudo clients based on emulation of a protocol associated with each of the target groups of subscriber devices;
instruct, by the dynamic scheduling device via in-band signaling, each of the pseudo clients to tune a different one of the hidden QAM channels to capture the customer-observable video stream output from the plurality of QAM tuners, to identify an error occurring with respect to an advertisement insertion event scheduled for one or more of the target groups of subscriber devices; and
store, by the assigned plurality of video client applications, a record of the advertisement insertion event in association with metadata identifying the assigned attributes of the target groups of subscriber devices.

18. The non-transitory computer-readable medium of claim 17, wherein the one or more instructions further includes instructions for causing the processor to:
identify the target groups based on one or more of a zip code, a demographic characteristic, a consumer profile, or a zone identifier (ID).

19. A system implemented in a service provider network, comprising:
- a plurality of quadrature amplitude modulation (QAM) tuners; and
- a device including a memory to store a plurality of instructions; and
- a processor configured to execute the instructions in the memory to:
    - identify an advertisement break in a video program schedule, wherein the advertisement break comprises a scheduled time slot in a video content carried via a first QAM channel;
    - identify multiple target groups of subscriber devices, associated with a plurality of customer premises networks, to receive targeted advertisements at the advertisement break based on attributes shared by customers within each of the target groups;
    - assign the attributes to each of a plurality of video client applications implemented in a plurality of pseudo-clients that simulate subscriber devices in the multiple target groups;
    - instruct the plurality of QAM tuners to tune from the first QAM channel to a plurality of hidden QAM channels to generate and output a customer-observable video stream to each of the pseudo clients based on emulation of a protocol associated with each of the target groups of subscriber devices;
    - instruct, via in-band signaling, each of the pseudo clients to tune a different one of the hidden QAM channels to capture the customer-observable video stream output from the plurality of QAM tuners, to identify an error occurring with respect to an advertisement insertion event scheduled for one or more of the target groups of subscriber devices; and
    - store a record of the advertisement insertion event in association with metadata identifying the assigned attributes of the at least one target group of subscriber devices.

* * * * *